(12) United States Patent
Morrison

(10) Patent No.: US 6,357,599 B1
(45) Date of Patent: Mar. 19, 2002

(54) MACHINE AND METHOD FOR FACILITATING SEPARATION OF MEMBERS OF A STACK

(75) Inventor: Michael Morrison, Stockton, CA (US)

(73) Assignee: Greif Bros. Corp. of Ohio, Inc., Delaware, OH (US)

( * ) Notice: Subject to any disclaimer, the term of this patent is extended or adjusted under 35 U.S.C. 154(b) by 0 days.

(21) Appl. No.: 09/633,164

(22) Filed: Aug. 4, 2000

Related U.S. Application Data

(60) Provisional application No. 60/151,951, filed on Sep. 1, 1999.

(51) Int. Cl.[7] ............................................. B07C 5/36
(52) U.S. Cl. ..................... 209/606; 209/509; 414/795.6
(58) Field of Search .................................. 209/509, 606, 209/617; 414/27, 788, 788.2, 788.3, 795.4, 795.6, 447, 450, 451, 780, 781, 787, 922, 923, FOR 104, FOR 105; 221/208, 209, 210, 224, 289, 290

(56) References Cited

U.S. PATENT DOCUMENTS

| | | | |
|---|---|---|---|
| 4,077,540 A | 3/1978 | Butler | 221/297 |
| 4,213,727 A | 7/1980 | Lighthipe, Jr. | 414/420 |
| 4,809,881 A | 3/1989 | Becker | 221/224 |
| 4,909,412 A | 3/1990 | Cerf | 221/1 |
| 4,991,741 A | 2/1991 | Anderson | 221/223 |
| 5,067,308 A | 11/1991 | Ward | 53/471 |
| 5,490,756 A | 2/1996 | Reichert et al. | 414/619 |
| 5,496,146 A | 3/1996 | Thomas et al. | 414/460 |
| 5,547,335 A * | 8/1996 | Lovett et al. | 414/795.6 |
| 5,681,141 A | 10/1997 | Critel | 414/789.02 |
| 5,746,570 A | 5/1998 | Gujda et al. | 414/795.6 |
| 5,791,867 A * | 8/1998 | Kuhl | 414/795.6 |
| 5,913,655 A | 6/1999 | Maday | 414/797.2 |

* cited by examiner

Primary Examiner—Christopher P. Ellis
Assistant Examiner—Mark J. Beauchaine
(74) Attorney, Agent, or Firm—Vorys, Sater, Seymour and Pease LLP

(57) ABSTRACT

A machine comprising a base and an elongated cradle pivotally mounted on the base is used to facilitate separation of nested tapered drums from a stack. With the cradle in an upright position, the machine is moved toward the stack to embrace the stack in the cradle. A pair of clamps on the cradle embrace and grip successive drums at a lower end of the stack, and then the cradle is moved to a lay-down position, carrying the stack with it. A first clamp of the pair, gripping a first drum, is moved away from a second clamp of the pair and then releases the first drum so that it can be separated from the second drum. The first clamp is then moved toward the second clamp. The second clamp releases the second drum, and the laid-down stack is moved along the cradle to align the second drum with the first clamp and a third drum in the stack with the second clamp. The first and second clamps then grip the second and third drums, respectively, and the first clamp is again moved away from the second clamp. The first clamp then releases the second drum to permit the second drum to be separated from the stack.

19 Claims, 5 Drawing Sheets

MACHINE AND METHOD FOR FACILITATING SEPARATION OF MEMBERS OF A STACK

CROSS-REFERENCE TO CO-PENDING APPLICATION

This application claims the benefit of provisional application No. 60/151,951 filed Sept. 1, 1999, incorporated herein by reference.

BACKGROUND OF THE INVENTION

This invention is concerned with separating members of a stack and is more particularly concerned with facilitating de-stacking of nested containers such as tapered drums.

Tapered drums, which may be fabricated from steel or plastic, for example, are used as containers for a variety of products. One of the advantages of the tapered drum is its nesting ability, so that when the drums are empty, they can be stacked up much like paper cups and shipped more economically than non-tapered drums.

A problem that occurs with tapered drums is that they tend to stick together when nested and stacked, making them difficult to separate. Each stack may contain eight to ten nested drums, for example, and is not easily handled manually. In a typical manual de-stacking process, a stack is pushed over onto a support, which may be comprised of old tires, for example, and then the drums are manually wrestled apart.

BRIEF DESCRIPTION OF THE INVENTION

The machine and process of the present invention greatly facilitate the de-stacking of nested tapered drums, minimizing the amount of manual labor required.

Typically, several stacks of nested tapered drums, each stack including eight to ten drums, for example, are placed on a wooden shipping pallet. The drums in the stack are upside down, so that the wider ends face downwardly, and each drum has an exposed wider end portion.

In its preferred form, a machine of the invention comprises a base supported on wheels and an elongated cradle pivotally supported on an end of the base. The cradle is moved between upright and lay-down positions by an actuator.

With the cradle in its upright position, the machine is moved toward a stack of drums, and the stack is embraced by the cradle. First and second clamps mounted on the cradle embrace and grip a first drum at the bottom of the stack and a second drum in the stack, respectively. The cradle is then moved to its lay-down position, carrying the embraced stack with it.

The first clamp is then moved away from the second clamp, to move the first drum away from the second drum in a de-nesting direction. Then the first clamp releases the first drum to permit the first drum to be separated from the stack.

Then the first clamp is moved toward the second clamp and the second clamp is released so that the stack can be moved along the cradle to align the second drum with the first clamp and a third drum of the stack with the second clamp. The clamps then grip the respective second and third drums, and the first clamp is again moved away from the second clamp to move the second drum away from the third drum. The first clamp then releases the second drum so that the second drum can be separated from the stack. This process is continued until all of the drums of the stack have been separated.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

Figure 1:
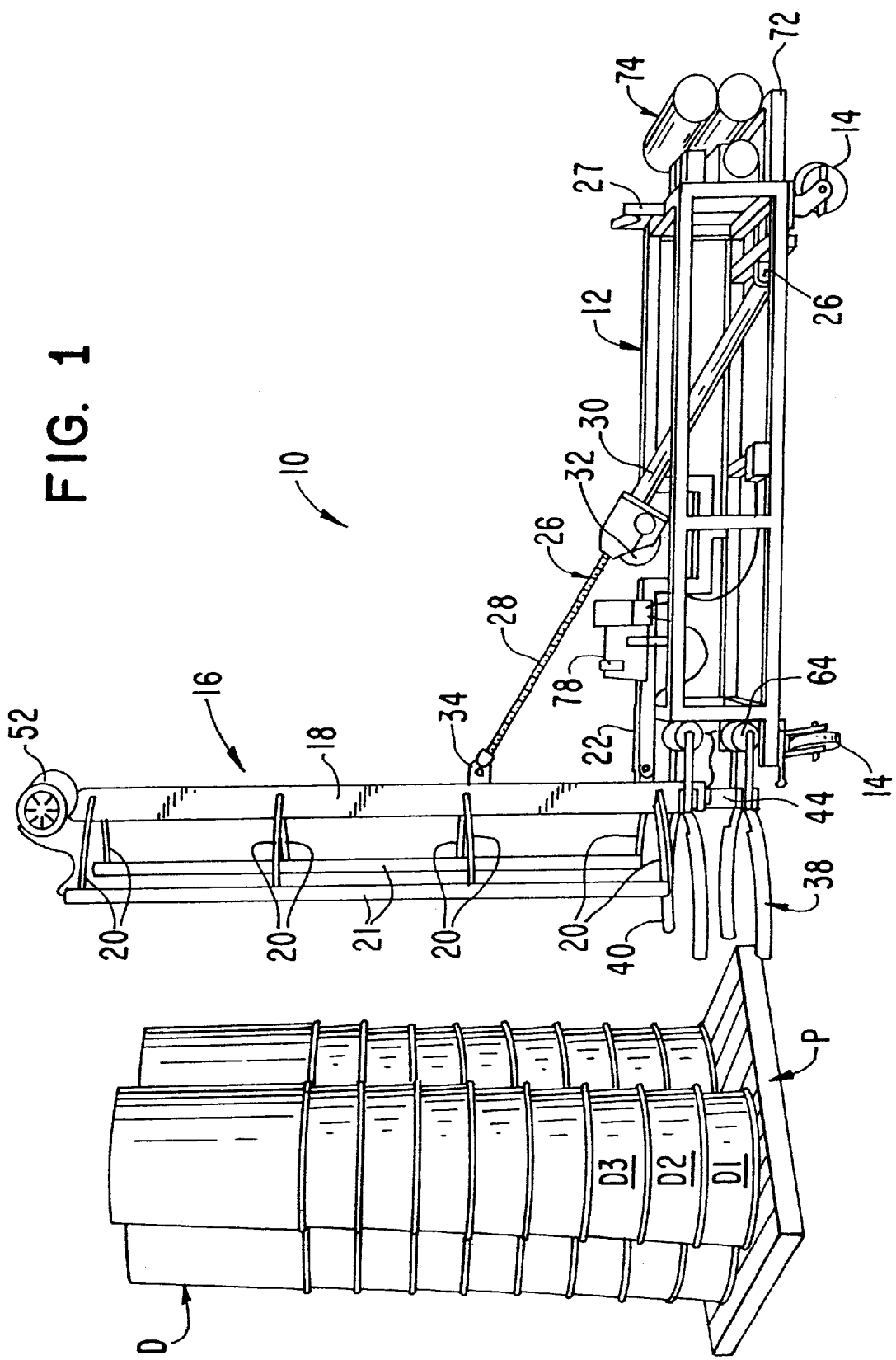
FIG. 1 is a perspective view showing a machine of the invention about to approach one of several stacks of nested tapered drums on a pallet.

As shown in FIG. 1, in its preferred form a machine 10 according to the invention comprises a base 12 of rectangular frame construction supported on caster wheels 14 at four corners of the bottom of the base and carrying an elongated cradle 16 pivotally supported on the base at one end thereof. The cradle comprises a longitudinal structural member 18 in the form of a square cross-section main tube to which are fixed a plurality of arcuate transverse structural members or ribs 20 that support a pair of parallel longitudinal stringers 21, which, together with tube 18, are designed to support a stack of nested tapered drums D thereon. The drum engaging surfaces of the longitudinal stringers 21 and the main tube 18 are preferably lined with friction-reducing nylon guide strips to facilitate movement of a stack of drums along the cradle. To provide for the pivotal mounting of the cradle on the base a bifurcated arm 22 projecting from an end of the base embraces a tab 24 at one end of the cradle, and a pivot pin is inserted through aligned holes in the arm and the tab.

Figure 3:
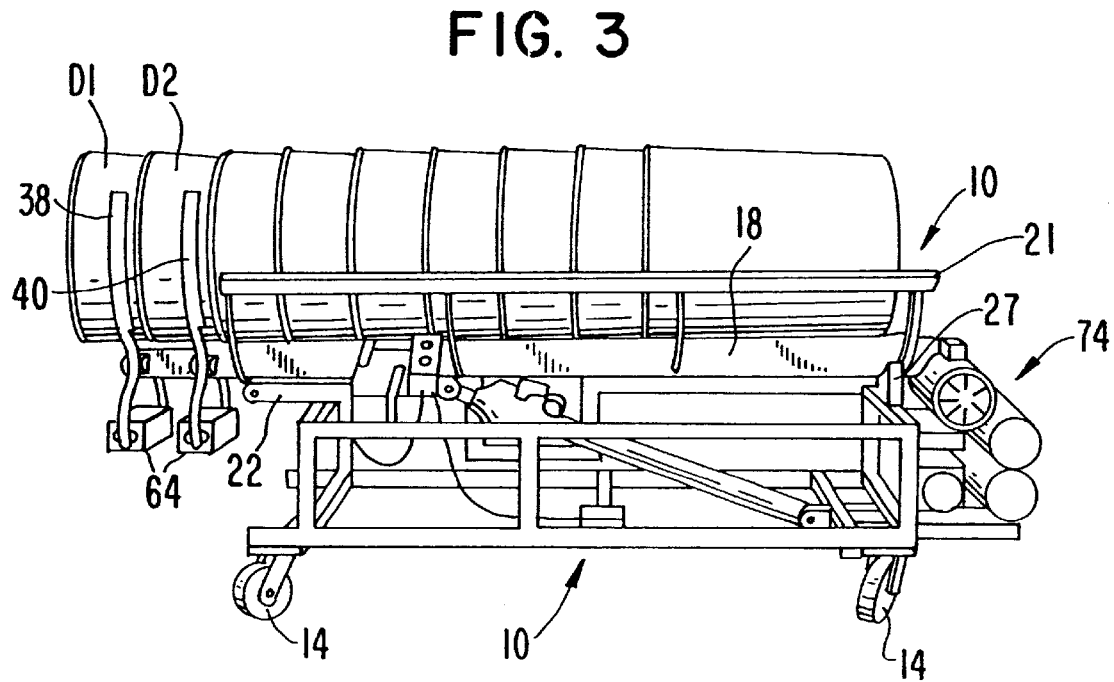
FIG. 3 is a perspective view showing the stack in a lay-down position.
Figure 5:
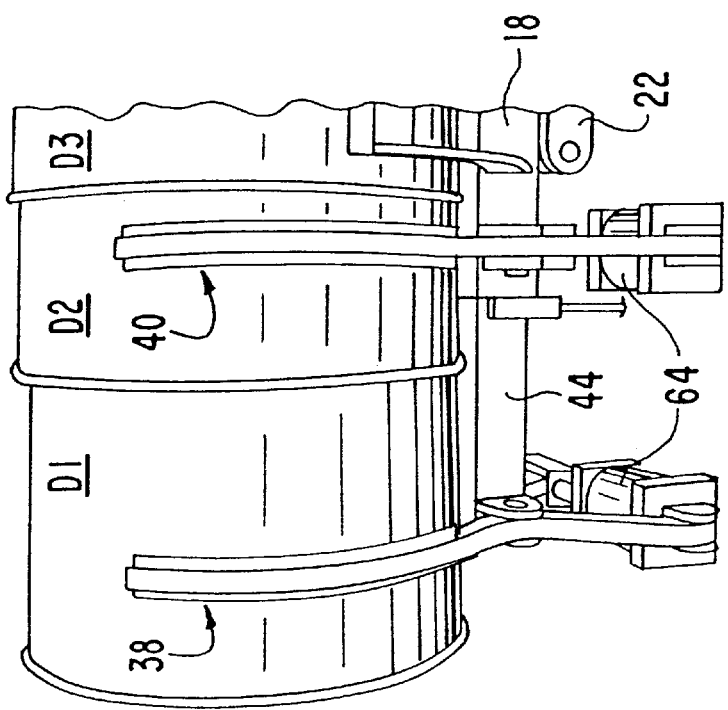
FIGS. 4 and 5 are fragmentary perspective views showing stages in a process of de-nesting of a pair of drums in the stack.
Figure 4:
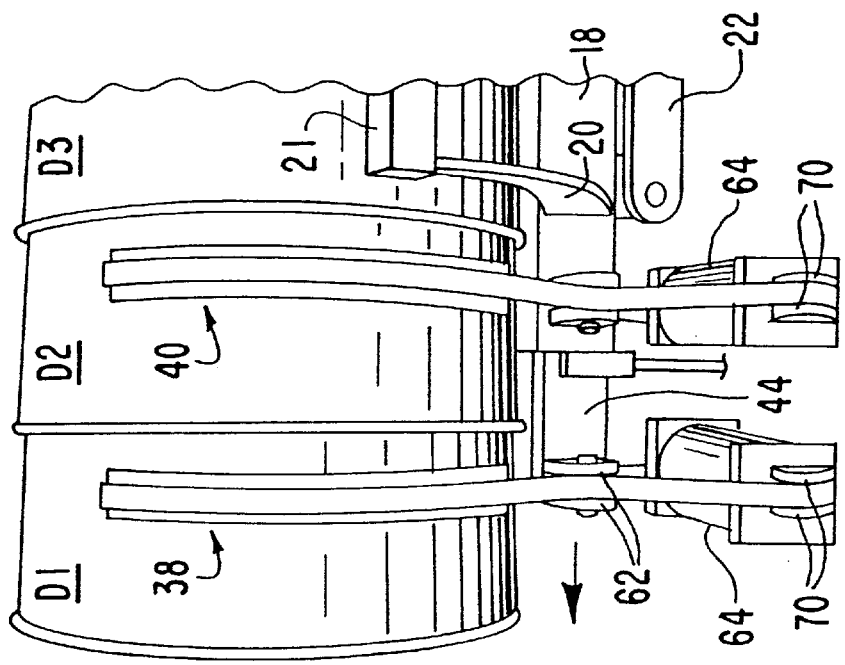
Figure 6:
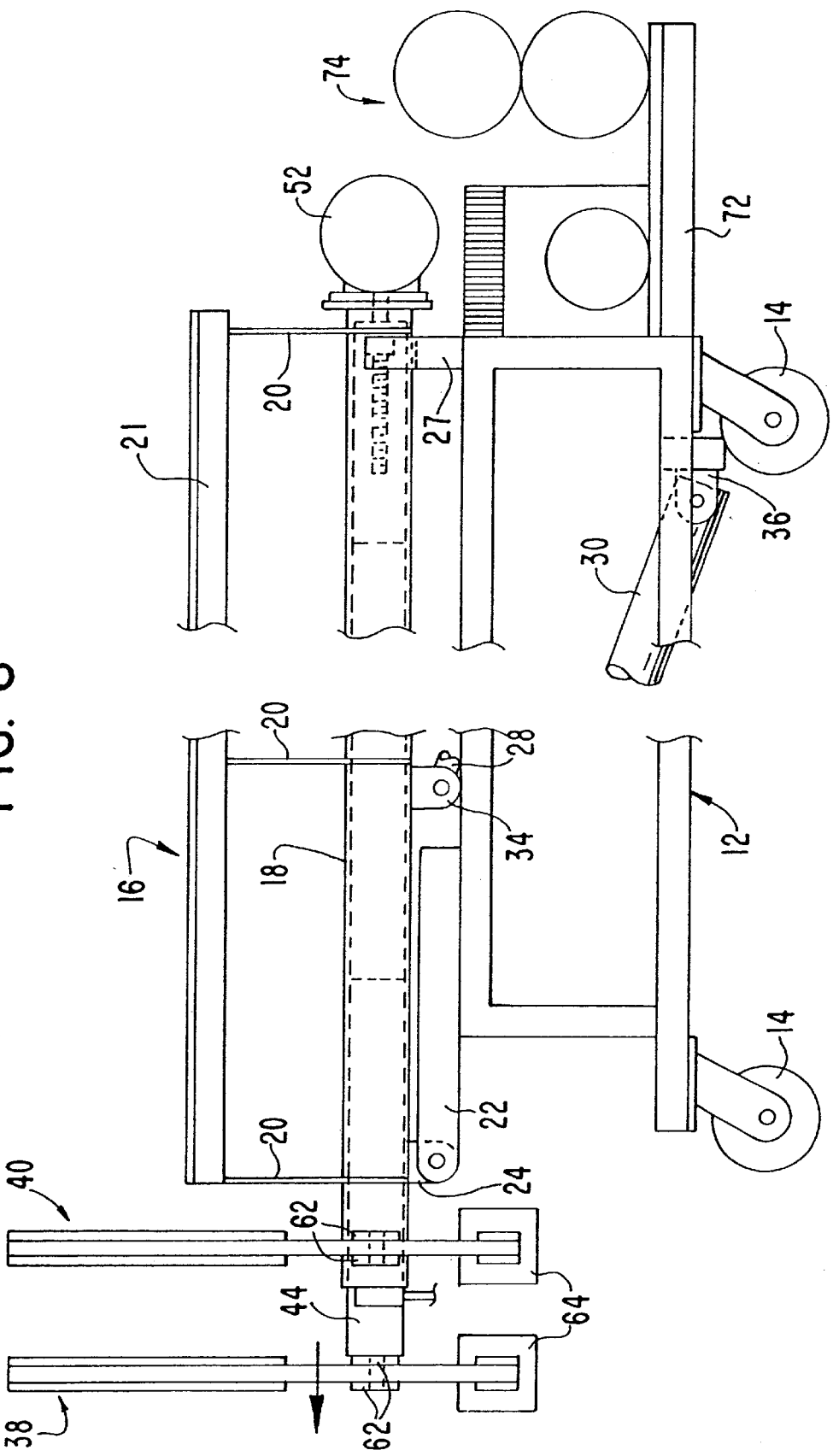
FIG. 6 is a contracted side elevation view showing portions of a machine of the invention.

The cradle 16 is movable between an upright position shown in FIG. 1 and a lay-down position shown in FIG. 3, by a linear actuator 26. A rest 27 receives the main tube 18 of the cradle when the cradle is in its lay-down position (FIG. 3). In the preferred embodiment, the actuator is a conventional ball screw driven by an electric motor. The ball screw has an elongated threaded member 28 that is driven into and out of a cylinder 30 by an electric motor 32. An outer end of the threaded member 30 is pivotally connected to tabs 34 on the tube 18 of the cradle, and an end of the cylinder is pivotally connected to tabs 36 on the base. The motor-driven ball screw has the advantage of a constant speed as the load changes during a process in which a stack of drums is lowered to a lay-down position.

Figure 7:
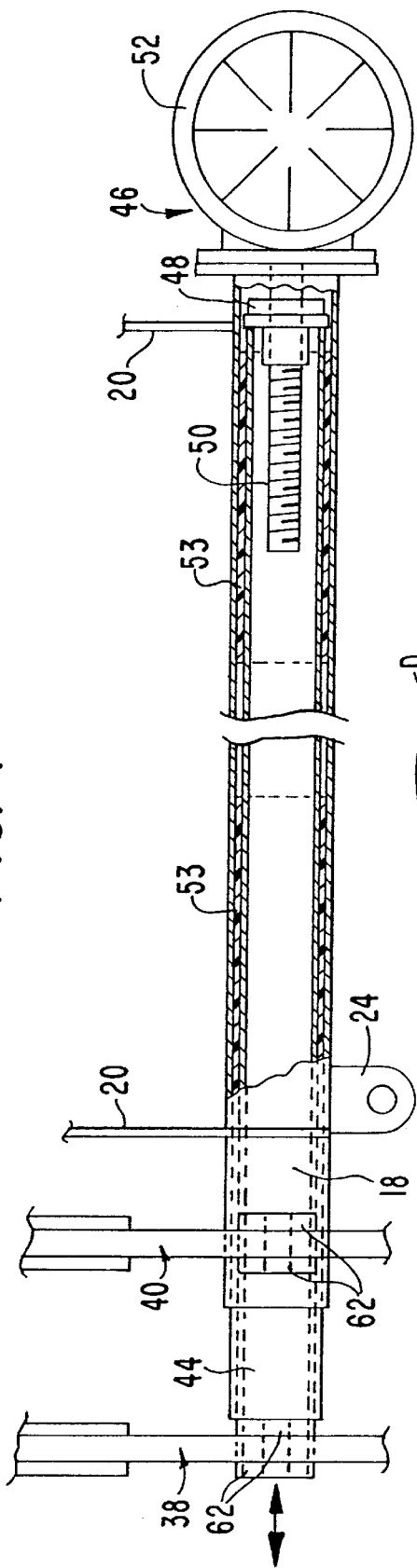
FIG. 7 is a fragmentary, contracted, partly sectional side elevation view showing portions of a machine of the invention.

As mentioned earlier, first and second clamps 38, 40 are supported on the cradle 16 at one thereof (the lower end when the cradle is upright). First clamp 38 is mounted on a structural member in the form of a square cross-section tube 44 supported for reciprocation within the main tube 18 of the cradle. See FIG. 7. Second clamp 40 is mounted on the main tube 18 of the cradle and is thus fixed in position on the cradle.

Tube 44 is driven outwardly and inwardly of tube 18 by a powered machine screw 46 located at the opposite end of the cradle from the clamps. A machine screw is used as the power source to initiate separation of the drums because of its constant speed. There are no sudden surges in the process of drum release, as could be experienced if a pneumatic cylinder were used as a power source. A nut 48 of the machine screw is fixed to an end of tube 44, and a feed screw 50 driven by a reversible electric motor 52 mounted on tube 18 drives the nut and the tube 44 back and forth in the tube 18. Nylon wear strips 53 are preferably added to the exterior of the tube 44 at all four sides and at both ends of the tube.

Figure 8:
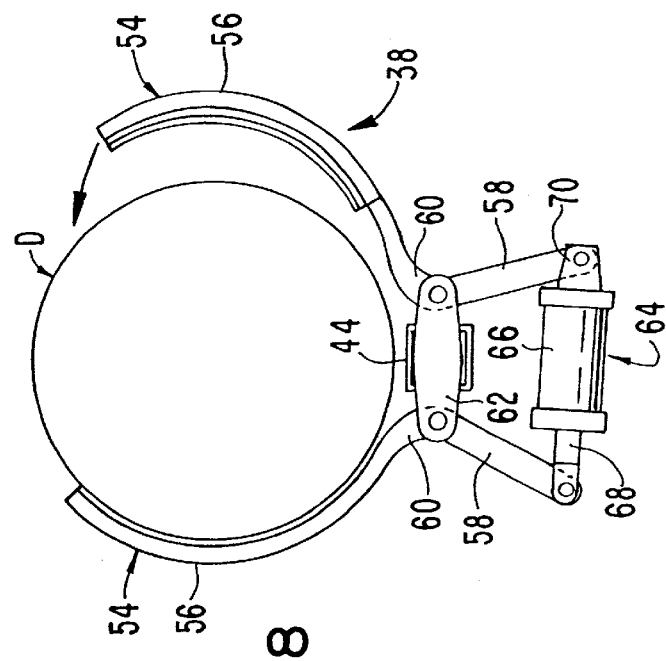
FIG. 8 is an end view showing a relationship of a clamp of the machine and a drum of the stack.

FIG. 8 shows clamp 38 (which is typical of both clamps) about to grip a tapered drum D. Each clamp comprises a pair of pivoted legs 54. Each leg has an arcuate gripping portion 56 at one end of the leg (preferably rubber faced to prevent scratching of drums), a driving portion 58 at the opposite end of the leg, and an intermediate pivotal mounting portion 60. The pivotal mounting portion of each leg is received between a pair of tabs 62 projecting from one of the tubes, and a pivot;pin is inserted through aligned holes in the tabs and the clamp legs. As shown in FIG. 8, one of the tabs for the first clamp extends across the tube 44 on which it is mounted.

The driving portion 58 of each leg is pivotally connected to a clamp operator 64. In the preferred embodiment, each operator is pneumatically driven and comprises a cylinder 66 and a piston rod 68 that moves in and out of the cylinder. Each cylinder has a pair of tabs 70 that receive a driving portion 58 of a leg therebetween, a pivot pin being inserted through aligned holes in the tabs and the leg driving portion. Each piston rod is bifurcated to embrace a leg driving portion 58, a pivot pin being inserted through aligned holes in the bifurcations and the leg driving portion. Each clamp is free-floating and self-centering. The pneumatic cylinders extend their piston rods to close the clamps. Pneumatic cylinders are preferred because they can apply a constant clamping pressure on a drum. A pressure regulator on an air compressor controls the clamp pressure.

Figure 2:
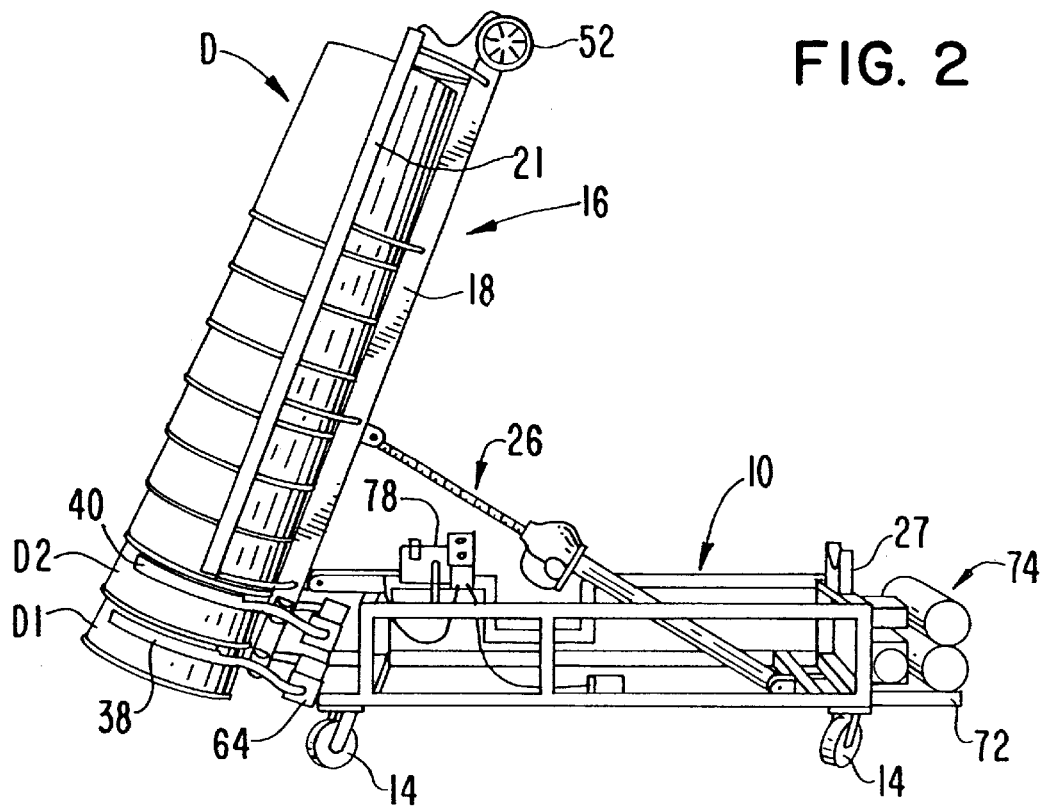
FIG. 2 is a perspective view showing a stack of nested tapered drums embraced by a cradle and clamps of the machine and being lowered to a lay-down position.

As shown in FIGS. 1–3 and 6, a platform 72 at the end of the base opposite to the pivotal mounting of the cradle supports a conventional air compressor 74 that is used to supply air to the clamp operators. The air compressor and an adjacent cabinet (not shown) where the electrical motor starters are located, act as a counterweight to the cradle. As shown in FIGS. 1–3, a control panel 78 is mounted on the base for user control of the various power units of the machine.

Typically, in the use of a machine of the invention, the clamps are opened and the cradle 16 is moved to its upright position by actuator 26, as shown in FIG. 1. The machine is rolled over to a stack of nested tapered drums supported on a pallet P until the cradle embraces the stack, with the first clamp 38 embracing a first drum D1 at the bottom of the stack and the second clamp 40 embracing a second drum D2 above the first drum. The clamps are then closed by their pneumatic cylinders 66 to grip the respective drums. By virtue of the fact that the clamps are free-floating and self-centering, positioning of the clamps around drums of a vertical stack is easily accomplished. The self-centering action of the clamps assures that a stack is in a correct position for laying the stack down and separating the drums. The machine can then be rolled away from the pallet, carrying the stack of drums with it.

As shown in FIGS. 2 and 3, the actuator 26 then lowers the cradle 16 to a lay-down position. Referring to FIGS. 4–7, the motor driven machine screw 46 moves the first clamp 38 away from the second clamp 40, thereby sliding the first drum D1 partially out of the second drum D2. Then the first clamp 38 is opened to release its grip on the first drum D1. Once the drums D1 and D2 have been pulled apart a few inches, they are easily slid apart the rest of the way by hand, so that the free first drum D1 can be taken off of the machine.

The second clamp 40 is then opened to release its grip on the second drum, and the open first clamp 38 is retracted to its home position closer to the second clamp 40. The remainder of the stack can then be advanced in the direction of the clamps by hand, so that the second drum D2 is aligned with the first clamp 38 and a third drum D3 is aligned with the second clamp. The clamps open quite wide, so that they are not in the way of removing drums or advancing a stack of drums along the cradle. Movement of the stack on the cradle is not difficult due to the nylon guide strips lining the cradle.

To separate the second drum D1 from the third drum D3, the clamps are closed to grip the respective drums; the first clamp 38 is moved away from the second clamp 40; and the first clamp is opened to permit the second drum D2 to be slid out of the third drum D3. The entire process of drum separation and stack advancement on the cradle can be repeated until all of the drums have been separated.

While a preferred embodiment of the invention has been shown and described, it will be apparent to those skilled in the art that changes can be made without departing from the principles and spirit of the invention, the scope of which is set forth in the appended claims. For example, while the invention has been described in its application to the separation of nested tapered drums of a vertical stack, the invention can be applied to a:series of different types of articles to be separated, and the stack may not be vertical initially or horizontal in its laid-down position. Furthermore, the cradle and the clamps can be modified to accommodate different article shapes, and different kinds of power units and actuators can be used when appropriate.

What is claimed is:

1. A machine for facilitating separation of nested containers, comprising:

a base;

an elongated cradle supported on the base for movement between an upright position and a lay-down position;

an actuator connected to the base and the cradle and constructed to move the cradle relative to the base between said positions; and a pair of clamps mounted on the cradle adjacent to an end thereof and spaced longitudinally of the cradle, one of the clamps being movable relative to the other clamp longitudinally of the cradle, each clamp having an operator for closing the clamp to grip a container and for opening the clamp to release the gripped container, wherein the cradle is constructed to embrace a stack of nested containers when the cradle is in its upright position and the clamps are disposed to embrace and grip respective containers at a lower portion of the stack, whereby the stack can be moved to a lay-down orientation when the cradle is moved to its lay-down position, and a container gripped by the one clamp can be moved in a de-nesting direction with respect to a container gripped by the other clamp when the one clamp is moved away from the other clamp.

2. A machine according to claim 1, wherein the base is supported on wheels for movement of the machine toward and away from the stack of nested containers.

3. A machine according to claim 1, wherein the cradle is pivotally mounted on the base adjacent to one end thereof.

4. A machine according to claim 1, wherein the actuator for moving the cradle comprises a screw-type actuator.

5. A machine according to claim 4, wherein the actuator is electrically operated.

6. A machine according to claim 1, wherein the cradle supports a motor for moving the one clamp relative to the other clamp.

7. A machine according to claim 6, wherein the cradle is supported on the base adjacent to one end of the cradle and the motor is mounted on the cradle adjacent to the opposite end of the cradle.

8. A machine according to claim 7, wherein the motor is connected to the one clamp by an elongated member supported on the cradle for movement along the length of the cradle.

9. A machine according to claim 8, wherein the motor is connected to the elongated member by a feed screw.

10. A machine according to claim 1, wherein each clamp operator comprises a pneumatic cylinder.

11. A machine according to claim 1, wherein each clamp is free floating and self-centering.

12. A machine according to claim 1, wherein the cradle comprises elongated members with friction-reducing surfaces that engage the stack when the stack is embraced by the cradle, to facilitate movement of the stack along the cradle.

13. A method for facilitating separation of members of a stack, comprising:
    embracing the stack in an upright cradle;
    moving the cradle and the embraced stack to a lay-down position;
    gripping two members of the stack with respective clamps; and
    moving one of the clamps away from the other clamp.

14. A method according to claim 13, wherein the gripping of the members of the stack occurs when the stack is embraced by the upright cradle.

15. A method according to claim 14, wherein the one clamp grips a first member at the bottom of the stack and the other clamp grips a second member above the first member.

16. A method according to claim 14, wherein the members of the stack are nested tapered containers with portions exposed for gripping by the clamps.

17. A method according to claim 14, wherein the one clamp is moved away from the other clamp while the first and second members are gripped by the clamps, and wherein after the one clamp is moved away from the other clamp, the one clamp releases the first member so that the first member can be separated from the stack.

18. A method according to claim 17, wherein after the first member is separated from the stack, the one clamp is moved toward the other clamp, the other clamp releases the second member, and the stack is advanced along the cradle to a position at which the second member can be gripped by the one clamp and a third member of the stack can be gripped by the other clamp, whereupon the clamps grip the second and third members, respectively, the one clamp is moved away from the other clamp, and then the one clamp releases the second member so that the second member can be separated from the stack.

19. A method for facilitating separation of articles of a series of articles supported on a cradle, comprising:
    providing a pair of clamps on the cradle, a first clamp of the pair being movable away from and toward a second clamp of the pair;
    aligning one article of the series with the first clamp and another article of the series with the second clamp;
    closing the clamps to grip respective aligned articles;
    moving the first clamp away from the second clamp;
    opening the first clamp to release the one article so that the one article can be separated from the other article;
    opening the second clamp;
    advancing the series of articles along the cradle for alignment of articles of the series with the clamps, respectively;
    closing the clamps to grip articles aligned therewith;
    again moving the first clamp away from the second clamp; and
    again opening the first clamp to release the article gripped thereby.

* * * * *